M. S. CURTIS.
PIPE PICKLING APPARATUS.
APPLICATION FILED APR. 2, 1912.

1,066,800.

Patented July 8, 1913.

WITNESSES

INVENTOR
Myron S. Curtis
by F. N. Barber
Attorney

UNITED STATES PATENT OFFICE.

MYRON S. CURTIS, OF YOUNGSTOWN, OHIO.

PIPE-PICKLING APPARATUS.

1,066,800. Specification of Letters Patent. Patented July 8, 1913.

Application filed April 2, 1912. Serial No. 688,035.

*To all whom it may concern:*

Be it known that I, MYRON S. CURTIS, a citizen of the United States, residing at Youngstown, in the county of Mahoning and State of Ohio, have invented new and useful Improvements in Pipe-Pickling Apparatus, of which the following is a specification.

My invention relates to apparatus for agitating iron or steel pipe in a pickling solution.

The principal object is to cause the pipes to hammer or pound one another in the pickling solution in order to remove therefrom the scale, silica, or other foreign matter.

Figure 1:
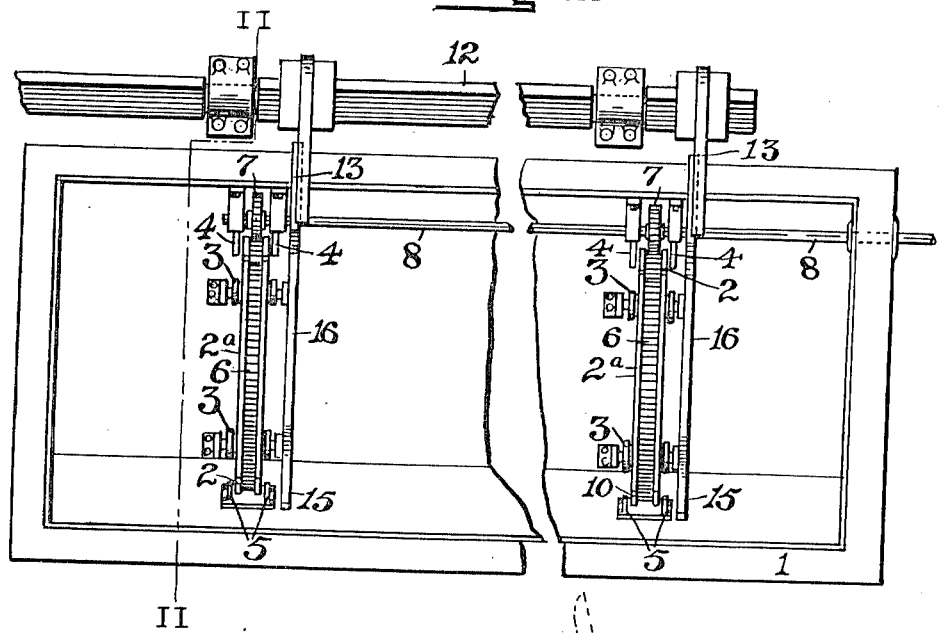
Figure 2:
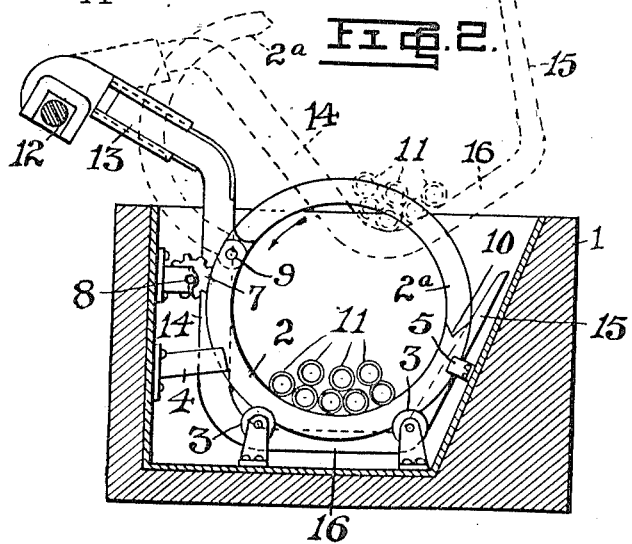

Referring to the accompanying drawing, Figure 1 is a plan, broken away in the center. Fig. 2 is a cross section on the line II—II, Fig. 1.

On the drawings, 1 represents a pickling tank having therein the vertical rings or cylinders 2 arranged transversely of the tank and supported on pairs of roller bearings 3, near the bottom of the tank 1. The roller bearings have end shoulders to keep the rings from working endwise. The sides of the tank are provided with pairs of guide arms 4 and 5, the members of each pair being on opposite sides of their respective rings and standing close thereto so as to maintain the rings in a vertical position.

The rings have shrouded cog-teeth 6 meshing with the pinions 7 on the shaft 8 which may receive its rotation from a motor or other prime mover, not shown.

As shown in Fig. 2 each ring has a section 2ª thereof pivoted to the remainder by the pin 9 or in any other proper manner. The free or unpivoted end of the said section 2 is reduced or tapered and fits in a correspondingly shaped notch in the free end of the main or other member, as shown at 10.

11 are pipes arranged lengthwise of the tank and supported on the interior circular wall of the rings 2, as shown in Fig. 2. The rings 2 are of such diameter and the roller bearings 3 are so low in the tank 1 that the pipes 11 when lying within and supported by the rings may be covered by the pickling solution in the tank as the rings rotate on the bearings 3.

12 is a square shaft arranged parallel with the tank 1, or the axis of the rings 2. The hangers 13, having at one end a recess fitting the square shaft 12, have their free ends hook-like and so proportioned and shaped that they may be rotated by the shaft 12 into the tank and have its lateral members 14 and 15 at opposite sides of the axis of the rings and out of contact with the pipes 11 during the rotating of the rings. The intermediate portion 16 of the hangers lies below the ring openings so as not to be engaged normally by the pipes when the rings 2 rotate.

Supposing the parts to be in the positions shown in full lines in Fig. 2, the shaft 8 is caused to rotate so as to rotate the rings in the direction shown by the arrow. As the rings rotate, the pipes 11 roll on one another, and fall upon and pound one another, thereby loosening the scale, silica, and other foreign matter thereon, giving the pickling solution a better opportunity to clean the pipes. When the pipes are pickled, the rings 2 are stopped with the section 2ª uppermost and the shaft 12 is made to rotate so as to cause the hook-like ends of the hangers 13 to lift the pipes 11 as shown in dotted lines, the pipes engage the under side of the sections 2ª and swing them back on their pins 9. The rotation of the shaft 12 will finally cause the sections 2ª to be swung to the position shown in dotted lines, that is, each section will be swung to the opposite side of its pin from its normal position so as to come to rest with its outer surface resting against the upper edge of the tank, or against some other support specially provided. After the pickled pipes 11 have been removed from the hangers by being dumped out therefrom by the continued rotation of the shaft 12, or by being otherwise handled, more pipes may be placed in the hook-like hangers 13, which together constitute a cradle, and the rotation of the shaft 12 is reversed, causing the cradle to lower the pipes upon the bottom sections of the rings 2; or the hangers, or cradle, may be lowered to the position shown in full lines, whereupon pipes may be deposited within the rings in any desired manner. The shaft 8 is set in motion again so as to rotate the rings 2 in the direction of the arrow, Fig. 2. When the pivoted ends of the sections 2ª reach the pinions, the latter will cause the sections 2ª to close automatically, and the pinion and the roller bearings 3 will keep the rings closed so as to prevent the escape of the pipes.

It will be readily understood that more than two rings 2 may be used; that the hangers, cradle or pipe lifting and lowering device may be variously constructed and operated so as to have the functions of my hangers or cradle without varying from the principles thereof; and that other parts may be modified without departing from the spirit of my invention as defined in the appended claims.

I claim—

1. In a pipe pickling apparatus, the combination of a pickling tank, rotary rings therein, in which the pipes to be pickled are supported, and means for rotating the rings, whereby the pipes are caused to roll on and pound one another.

2. In a pipe pickling apparatus, the combination of a pickling tank, rotary rings therein, in which the pipes to be pickled are supported, and means for rotating the rings, the said rings having a displaceable section, through which the pipes may be introduced into the rings or removed therefrom.

3. In a pipe pickling apparatus, the combination of a pickling tank, rotary rings therein, in which the pipes to be pickled are supported, means for rotating the rings, the said rings having a displaceable section, through which the pipes may be introduced into the rings or removed therefrom, and means for lifting the pipes and causing them to engage and open the said section.

4. In a pipe pickling apparatus, a tank, a plurality of rotatable rings arranged in axial alinement in the tank, an annular series of teeth on the rings, and driving means engaging with the annular series of teeth.

5. In a pipe pickling apparatus, a tank, a plurality of rotatable rings, each ring having displaceable segments and arranged in the tank, an annular series of teeth on the said rings and the segments thereof, and driving means engaging the said teeth.

6. In a pipe pickling apparatus, a tank, curved members in the tank, arranged crosswise thereof, and having their lowest portions with their hollow surfaces upward, means supporting and guiding the curved members, and means for causing the curved members to move transversely of the tank on the said supporting and guiding means.

Signed at Pittsburgh, Penna., this 1st day of April, A. D. 1912.

MYRON S. CURTIS.

Witnesses:
ALICE E. DUFF,
ELVA STANIEK.